2,813,097

3-HYDROXY-N-METHYLMORPHINAN-N-OXIDE

Burris D. Tiffany, Kalamazoo, Mich., assignor to The Upjohn Company, Kalamazoo, Mich., a corporation of Michigan No Drawing. Application August 16, 1955, Serial No. 528,803

4 Claims. (Cl. 260—285)

This invention relates to new organic compounds and is particularly directed to 3-hydroxy-N-methylmorphinan N-oxide either as the free base or as an acid addition salt thereof.

It is an object of the invention to provide novel physiologically active compounds. It is a further object to provide novel analgesics and narcotics. It is a further object to provide novel compounds which are safe and effective for these purposes and have a higher therapeutic index than the corresponding tertiary amine.

These and other objects are accomplished in the novel compounds of the invention which are represented by the following basic formula:

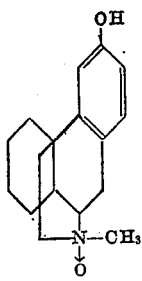

and can exist and can be used for the purposes of the invention in the form of the free base or an acid addition salt thereof with a pharmacologically acceptable acid such as hydrochloric hydrobromic, hydriodic, sulfuric, phosphoric, nitric, acetic, benzoic, salicylic, glycolic, succinic, nicotinic, tartaric, maleic, malic, lactic acids, and the like.

The invention may be more fully understood by the following examples which are illustrative only and not to be construed as limiting.

*Example 1.—3-hydroxy-N-methylmorphinan N-oxide free base*

In a two-liter Erlenmeyer flask 8.2 grams (about 0.03 mole) of crude dl-3-hydroxy-N-methylmorphinan free base, obtained by neutralizing dl-3-hydroxy-N-methylmorphinan hydrobromide with concentrated ammonium hydroxide and filtering, washing, and drying the precipitated free base, was dissolved in 900 milliliters of absolute methanol with stirring. The solution was clarified by filtration and then ten milliliters (about 0.117 mole) of thirty percent hydrogen peroxide was added with stirring. After 24 days at room temperature the mixture gave a positive test for hydrogen peroxide with acidified iodide solution. About 0.2 gram of active thirty percent platinum-on-carbon catalyst was added to the mixture, causing mild gas evolution which ceased after five hours of stirring, at which time a test for hydrogen peroxide was negative. A filter aid was added and the solution was filtered. The clear, almost colorless filtrate was concentrated under nitrogen in a water bath at about fifty degrees centigrade; 3-hydroxy-N-methylmorphinan N-oxide free base was thus obtained as a brown syrup.

*Example 2.—3-hydroxy-N-methylmorphinan N-oxide hydrochloride*

Upon treatment of the syrup of Example 1 with 2.5 milliliters of concentrated hydrochloric acid slow crystallization occurred. After two hours, forty milliliters of absolute ethanol was added to the mixture. This mixture was cooled and the resulting white crystals were collected, washed with a mixture of absolute ethanol and ether, and dried for a yield of 5.8 grams (62 percent) of 3-hydroxy-N-methylmorphinan N-oxide hydrochloride as a white powder, melting at 243–7 degrees centigrade with decomposition, depending upon the rate of heating. An additional 0.3 gram (total 6.1 grams, 65 percent) was obtained from filtrates. Two recrystallizations of one gram of the solid by dissolving in ten milliliters of boiling water, concentrating to two milliliters, and cooling gave 0.72 gram of white solid when collected, washed with four milliliters of tetrahydrofuran, and dried.

*Analysis.*—Calc. for $C_{17}H_{24}ClNO_2$: C, 65.91; H, 7.81; Cl, 11.45. Found: C, 66.02; H, 7.82; Cl, 11.60.

In place of the dl-3-hydroxy-N-methylmorphinan as the starting material for Examples 1 and 2, there may be substituted either the d- or the l-isomer.

In place of hydrochloric acid there may be substituted appropriate acids to obtain the hydrobromide, the hydroiodide, the sulfate, the phosphate, the nitrate, the acetate, the benzoate, the salicylate, the glycolate, the succinate, the nicotinate, the tartrate, the maleate, the malate, the lactate, and the like.

The novel compounds of this invention can be used for the same purposes and in the same dosage forms, such as tablets, injectables, and elixirs, as 3-hydroxy-N-methylmorphinan and the salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 3-hydroxy-N-methylmorphinan N-oxide.
2. 3-hydroxy-N-methylmorphinan N-oxide free base.
3. 3-hydroxy-N-methylmorphinan N-oxide acid addition salt of a pharmacologically acceptable acid.
4. 3-hydroxy-N-methylmorphinan N-oxide hydrochloride.

References Cited in the file of this patent

FOREIGN PATENTS 662,830    Great Britain _____ Dec. 12, 1951